United States Patent
Best

(10) Patent No.: US 11,555,615 B2
(45) Date of Patent: *Jan. 17, 2023

(54) INCINERATING CONTAINER FOR BROILING

(71) Applicant: Willie H. Best, Columbia, SC (US)

(72) Inventor: Willie H. Best, Columbia, SC (US)

(*) Notice: Subject to any disclaimer, the term of this patent is extended or adjusted under 35 U.S.C. 154(b) by 146 days.

This patent is subject to a terminal disclaimer.

(21) Appl. No.: 17/082,635

(22) Filed: Oct. 28, 2020

(65) Prior Publication Data

US 2021/0041111 A1 Feb. 11, 2021

Related U.S. Application Data

(63) Continuation of application No. 16/653,666, filed on Oct. 15, 2019, now Pat. No. 10,823,429.

(60) Provisional application No. 62/746,073, filed on Oct. 16, 2018.

(51) Int. Cl.
| | |
|---|---|
| *F24C 15/18* | (2006.01) |
| *A47J 37/06* | (2006.01) |
| *F23D 14/14* | (2006.01) |
| *F23D 14/12* | (2006.01) |

(52) U.S. Cl.
CPC .......... *F24C 15/18* (2013.01); *A47J 37/067* (2013.01); *F23D 14/14* (2013.01); *F23D 14/151* (2021.05); *F23D 2203/102* (2013.01); *F23D 2212/10* (2013.01)

(58) Field of Classification Search
CPC ........ F24C 15/107; F24C 3/085; F24C 15/18; F24C 15/14; F23D 14/14; F23D 2203/102; F23D 2212/10; A47J 37/067
See application file for complete search history.

(56) References Cited

U.S. PATENT DOCUMENTS

| | | |
|---|---|---|
| 3,098,477 A | 7/1963 | Lotter |
| 3,561,902 A | 2/1971 | Best |
| 3,857,670 A | 12/1974 | Karlovetz et al. |
| 4,798,192 A | 1/1989 | Maruko |
| 5,062,408 A | 11/1991 | Smith et al. |
| 5,076,154 A | 12/1991 | Bagwell |
| 5,085,579 A | 2/1992 | Moore, Jr. et al. |
| 5,211,105 A | 5/1993 | Liu |
| 5,347,978 A | 9/1994 | Zuran |
| 5,355,841 A | 10/1994 | Moore, Jr. et al. |
| 5,363,751 A | 11/1994 | Prestigiacomo |
| 5,947,013 A | 9/1999 | Stewart, Jr. |
| 6,114,666 A | 9/2000 | Best |
| 6,158,330 A | 12/2000 | Andress |
| 6,205,996 B1 | 3/2001 | Ryan |
| 6,701,829 B2 | 3/2004 | Farrow |
| 6,869,629 B2 | 3/2005 | Tiernan |
| 7,726,967 B2 | 6/2010 | Best |

(Continued)

*Primary Examiner* — Alfred Basichas

(74) *Attorney, Agent, or Firm* — B. Craig Killough

(57) ABSTRACT

An incinerating container for grills and similar broilers. The incinerating container receives products of combustion from a gas burner or hot gases from an electric element or other heat source. Apertures in a top of the incinerating container receive oil into the incinerating container, such as oils from melted fat as food cooks. The oils are incinerated within the incinerating container. The apertures formed in the top allow hot oils to enter the incinerating container for combustion of the oils within the incinerating container, and are constructed to prevent flames from materially exiting the incinerating container.

25 Claims, 15 Drawing Sheets

(56) References Cited

U.S. PATENT DOCUMENTS

| | | |
|---|---|---|
| 7,853,129 B2 | 12/2010 | Best |
| 8,074,634 B2 | 12/2011 | Best |
| 8,227,728 B2 | 7/2012 | Best |
| 8,770,181 B2 | 7/2014 | Best |
| 8,890,037 B2 | 11/2014 | Best |
| 10,823,429 B2 | 11/2020 | Best |
| 2016/0037969 A1 | 2/2016 | Renner |

INCINERATING CONTAINER FOR BROILING

This Application is a continuation of U.S. application Ser. No. 16/653,666 filed Oct. 16, 2019, U.S. Pat. No. 10,823,429 issued Nov. 3, 2020, which claims the benefit of U.S. Provisional Application No. 62/746,073 filed Oct. 16, 2018.

BACKGROUND OF THE INVENTION

Broiling, such as grilling, is a popular and efficient way to cook food. Broiling is usually performed by placing food over or under heat that is generated by combustion of fuel or an electric heating element. The fuel may be wood, charcoal or gas, such as natural gas or propane.

When meats are cooked, particularly those having substantial fat content, the liquified fat resulting from cooking drips onto the heat source, resulting in excessive flame (commonly referred to as flare up). Flare ups are undesired flames resulting from burning of oils by the heat source. The result of flare ups is undesired charring of meat and uneven cooking of the meat. Usually flare ups are controlled by applying water or water spray to extinguish the flare ups. In other instances, the flare up is controlled by limiting the supply of air to support combustion.

Flare ups can be a particular problem with commercial grills where substantial heat is generated due to continuous cooking for several hours, and due to a high quantity of meat (and resulting melted fat) that is cooked on commercial grills. A high heat level is desired to decrease cooking time in many commercial settings. Increased flare ups from higher temperatures may be detrimental to food quality.

SUMMARY OF THE INVENTION

The present invention incorporates an incinerating container or chamber in combination with an energy emitting top surface that may be used with grills. The invention retards excessive charring of food, and primarily meat, due to excessive flame contacting food as it cooks.

The incinerating container receives products of combustion from a gas burner or hot gases from an electric element or other heat source. Apertures in a top of the incinerating container receive oil into the incinerating container, such as oils from melted fat as food cooks. The oils are incinerated within the incinerating container. The apertures formed in the top allow hot oils to enter the incinerating container for combustion of the oils within the incinerating container, and are constructed to prevent flames from materially exiting the incinerating container. The top of the incinerating container emits infrared radiation for cooking, and is cooler than an interior of the incinerating container.

BRIEF DRAWING DESCRIPTION

DESCRIPTION OF PREFERRED EMBODIMENTS

Figure 1:
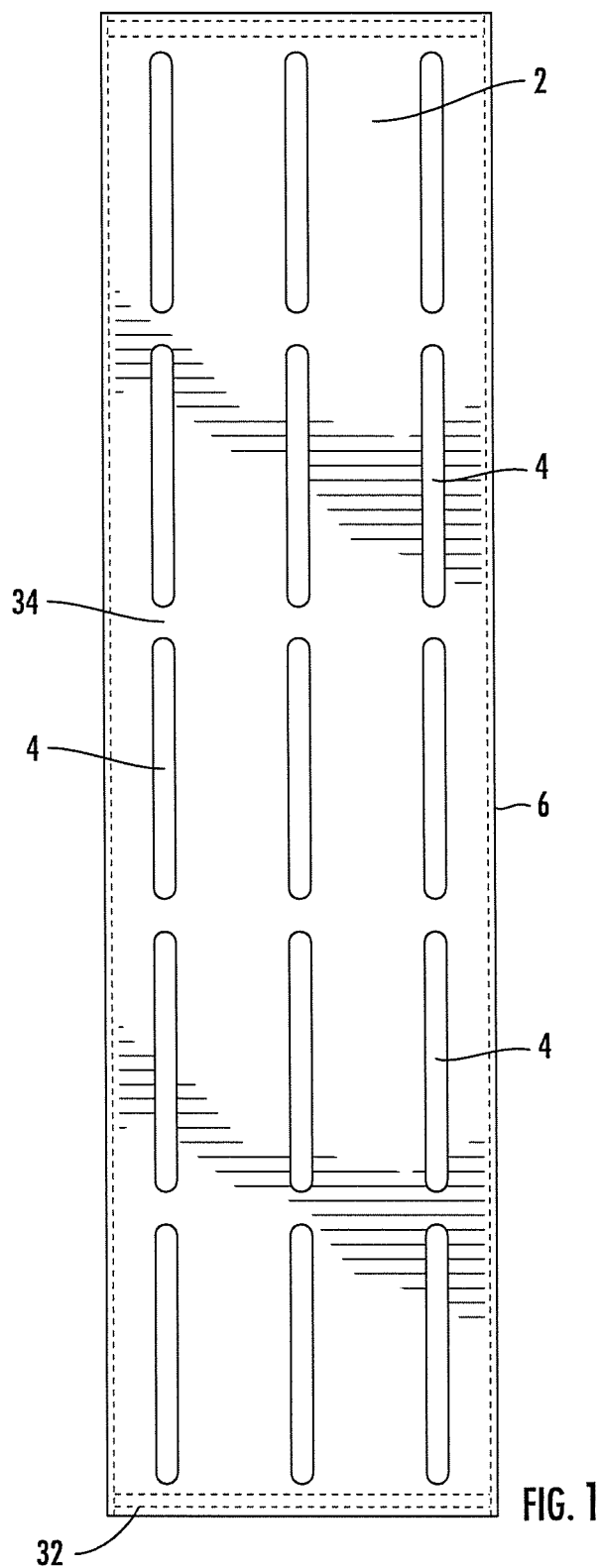
FIG. 1 is a plan view of a single incinerating container construct.

The present invention incorporates an incinerating container 6,106 that is useful in grilling and/or broiling when food expels combustible fluids that create undesired excessive flames when ignited by heat from the energy source. The incinerating container may be characterized as a flame-resistant container that is positioned above a heat source 12 and below food 38 being grilled and/or broiled. The incinerating container is constructed and arranged to receive oil 40 from above the incinerating container and into the interior of the incinerating container through a plurality of apertures 4,104,204 formed in a top enclosure 2,102, 202 of the container that emits infrared energy. The incinerating container is constructed and arranged to retain the oil within the interior of the container where the oil is burned. The incinerating container receives and holds oil from melted fat rather than draining the oil away from the heat, and prevents flames from the oil burned within the incinerating container from reaching food that is being cooked.

The device comprises a plurality of apertures 4,104,204 formed in the infrared emitting surface that forms the top enclosure 2,102, 202 of the incinerating container construct 6,106. The incinerating container may be positioned under a food support 36 for meat or other food being cooked so that oil 40 dripping from the food 38 enters the incinerating container through the apertures of the top enclosure. The area and dimensions of the individual apertures are sufficiently large to allow liquified fat and other flammable oils to enter the interior of the incinerating container, but the dimensions of the individual apertures are sufficiently small to quench or arrest flame (flare ups) that result when the liquified fat or other oil comes in contact with heat within the incinerating container. The incinerating container prevents the flame from materially exiting the interior of the incinerating container and prevents flare ups that are detrimental to cooking food. In the embodiments shown in the drawings, the apertures are formed as elongated slots or round apertures, but the apertures may be formed in other geometric shapes, such as elliptical, as long as the requirement of permitting oils from cooking to enter the apertures while also providing flame quenching or arresting.

The present invention according to an embodiment shown in FIGS. 1-4 comprises a top enclosure that is an infrared emitting surface 2 in combination with an incinerating container 6 that collectively form an incinerating container construct. The infrared emitting surface is formed as a top enclosure of the incinerating container. Apertures 4 formed in the infrared emitting surface allow hot oils 40 to enter the incinerating container 6. Heated air or combustion air for incineration of oils/fats within the incinerating container 6 is supplied through apertures 8 formed therein and through which pass products of combustion (containing excess air) from a gas burner 12 (FIG. 5) or other heat source or from hot gases from an electric element. The products of combustion are then exhausted through apertures 4 of the emitting surface. In another embodiment, combustion products (heated combustion air) are exhausted after exiting the apertures around the perimeter or partial perimeter of a plurality of infrared emitting surfaces 2 and below a food support 36, so that cooking is achieved by infrared radiation and not by convection that may have a drying effect on the food 38.

Figure 5:
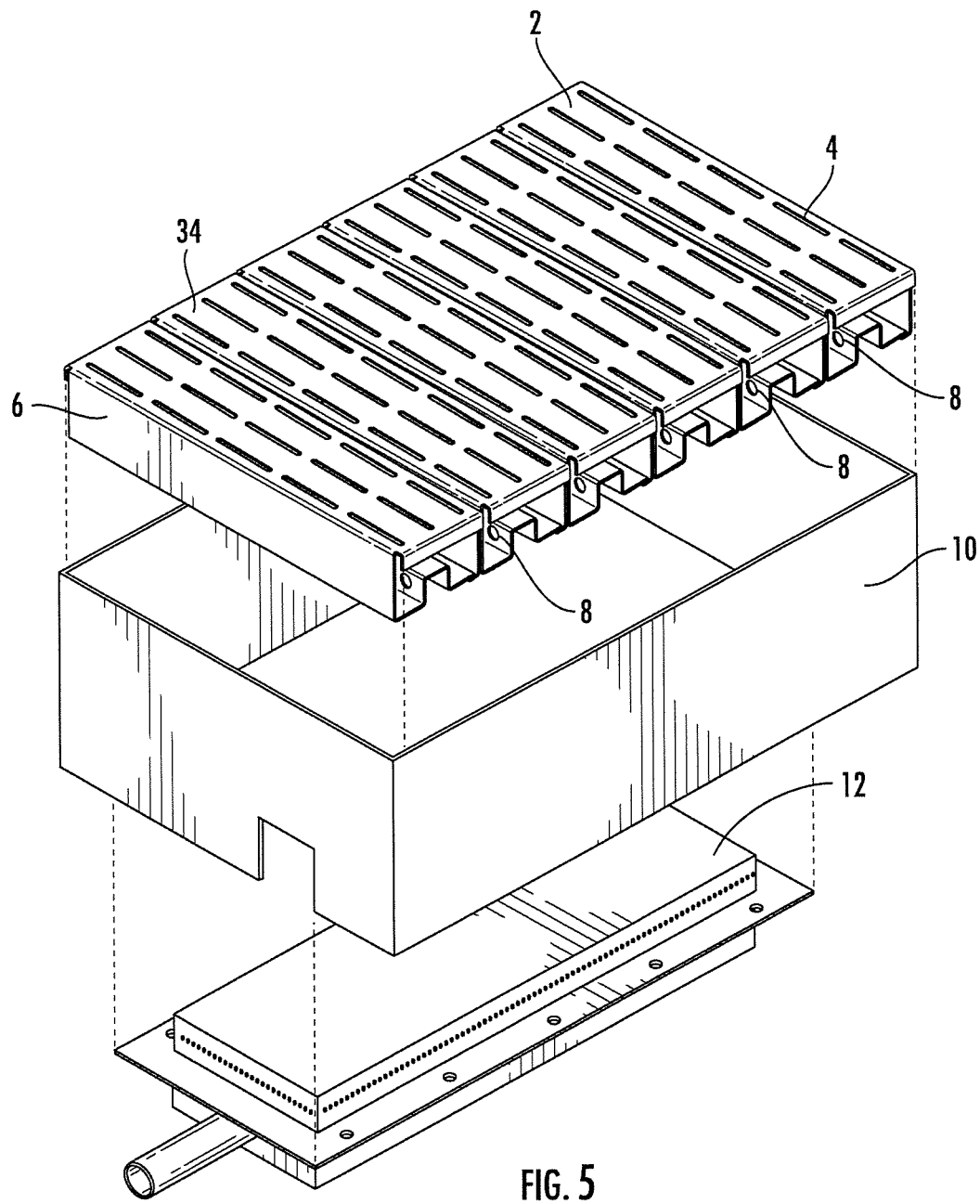
FIG. 5 is an exploded isometric view showing incinerating container constructs and elements of a cooking apparatus useful with the incinerating container constructs.

It is preferred that the total area of receiving apertures 8, 108 formed in the incinerating containers exceeds the total area of the apertures 4, 104, 204 in the infrared emitting surface so that adequate air is available for combustion of the oil 40 received in the incinerating container. However, heated air may also enter the incinerating containers in other ways, such as by the ends of the incinerating container 6 being open, so that the area of openings for receiving heated air through receiving apertures 8 and/or other openings in the incinerating container exceed the area of the receiving apertures 4. The plurality of incinerating container constructs as shown in FIG. 5 are supported by a combustion chamber 10 having sides or walls.

The emitting surface 2 may be a top enclosure attached to an incinerating container 6 to enclose a top surface of the incinerating container. Alternatively, the incinerating container may be supported by a side wall of the combustion chamber 10 or by other means with the emitting surface 2 positioned over the incinerating container without being attached to the incinerating container thereby allowing the emitting surfaces to be easily removed to facilitate cleaning of both the emitting surface 2 and the interior of the incinerating container 6. Also, an incinerating container may be easily cleaned by rinsing under running water such as by using a water faucet.

The most common material for the fabrication of the incinerating container 6 and the emitting surface 2 is stainless steel or another preferably non-corrosive metal. For example, incinerating containers may be formed of stainless steel, such as 304 or 316L stainless steel. Since the infrared emissivity of stainless steel (the ability to radiate infrared energy) is relatively low compared to ceramic surfaces, emissivity of the emitting surface may be improved by various treatments of the top of the emitting surface. Such treatments are also useful to improve corrosion resistance, durability and the output of infrared energy by the emitting surface.

It is desirable that the top surface, such as the top enclosure, have a relatively high emissivity that provides a top surface that is cooler than the interior of the cooler. The top surface may be modified or coated to increase emissivity. Surface treatments may include oxidation of the emitting top surface 2 and/or abrasion of the emitting top surface. The top emitting surface may be coated or laminated with ceramic materials and used without or in combination with abrasion and oxidation of the emitting surface. One ceramic coating has demonstrated excellent results in minimizing corrosion while providing infrared emissivity of about 0.9.

In addition to the methods described above to modify the emitting surface 2, other metals or ceramics may be laminated to the top of the emitting surface. In one example, a thin sheet of titanium is bonded to the emitting surface 2. In another example, a thin (for example, 20-22 ga.) perforated sheet of nickel-chrome alloys is affixed to the top of the emitting surface. When another sheet of material is bonded to the emitting surface 2 apertures formed in the sheet of material and in the emitting surface must be aligned to facilitate entry of oils into the incinerating container and the escape of products of combustion according to the invention.

When metal of a different alloy is laminated to the top of the emitting surface, a bond between the two metals may be accomplished by spot welding and/or by using a ceramic material as a bonding agent. Extensive testing by the inventor of a laminate between the base metal of the emitting surface of the top enclosure 2 and a perforated nickel chrome alloy (rated at a higher temperature and corrosion resistance) produces a surface that is highly resistant to corrosion while withstanding temperatures in excess of 1,000° F. Also, when the top enclosure is coated with ceramic 34, the ceramic does not block the apertures 4,104, 204 and produces a surface of ceramic that is securely bonded to the base metal of the emitting surface. This construction protects the base metal from fatty acids to which it is exposed as a result of the broiling process. Further, the emissivity of the surface formed of, or coated with, ceramic may be about 0.9 or possibly greater.

In some cases, exhaust gases from combustion exit the apertures 4 in combination with another opening or openings, such as a perimeter of the infrared emitting surface and/or walls forming the incinerating container, which may be ends of the incinerating container constructs. This method of construction provides a bypass for the exhaust gases in the event the apertures 4 become clogged due to poor maintenance.

Figure 6:
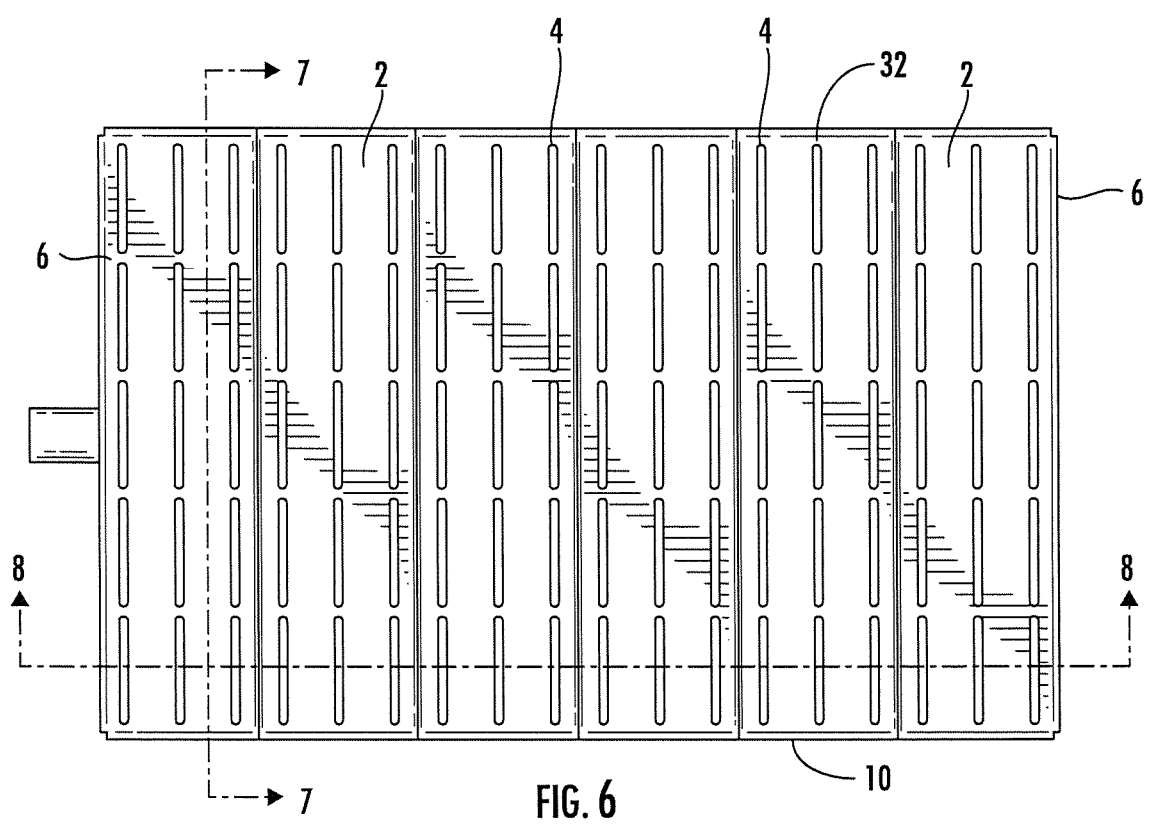
FIG. 6 is a top plan view of assembled incinerating container constructs.

In an embodiment, a lower surface of the incinerating container has a riser 18. The plurality of receiving apertures 8 formed on sides of the riser allow the heated air such as combustion air to enter the incinerating container 6. The incinerating containers in this embodiment are positioned side by side and may be in contact with each other. The riser allows heated air to enter the receiving apertures 8 formed in the riser when the incinerating containers are side by side since there is insufficient spacing between the incinerating containers to permit material heated air to flow between the incinerating containers. When the incinerating containers are positioned side by side as shown in FIG. 6, the incinerating containers are preferred to abut each other and/or the combustion chamber to prevent material amounts of oil from entering the spaces between the incinerating containers.

The risers 18 may be formed in a lower surface of the incinerating containers 6. The risers may be formed with a first side member 20 having the plurality of receiving apertures 8 formed therein and a second side member 22 having the plurality of receiving apertures formed therein. The incinerating container may comprise a first exterior side member 24 that is opposite the first side member and a second exterior side member 26 that is opposite the second side member. A first receptacle 28 is formed between the first side member and the first exterior side member. A second receptacle 30 is formed between the second side member and the second side member. The first receptacle and the second receptacle are so constructed and arranged to retain oil 40 from cooking within the first receptacle and/or the second receptacle. Heated air, such as combustion air, enters the plurality of receiving apertures 8 formed in the side members for incineration of the oil within the interior of the incinerating container.

Figure 2:
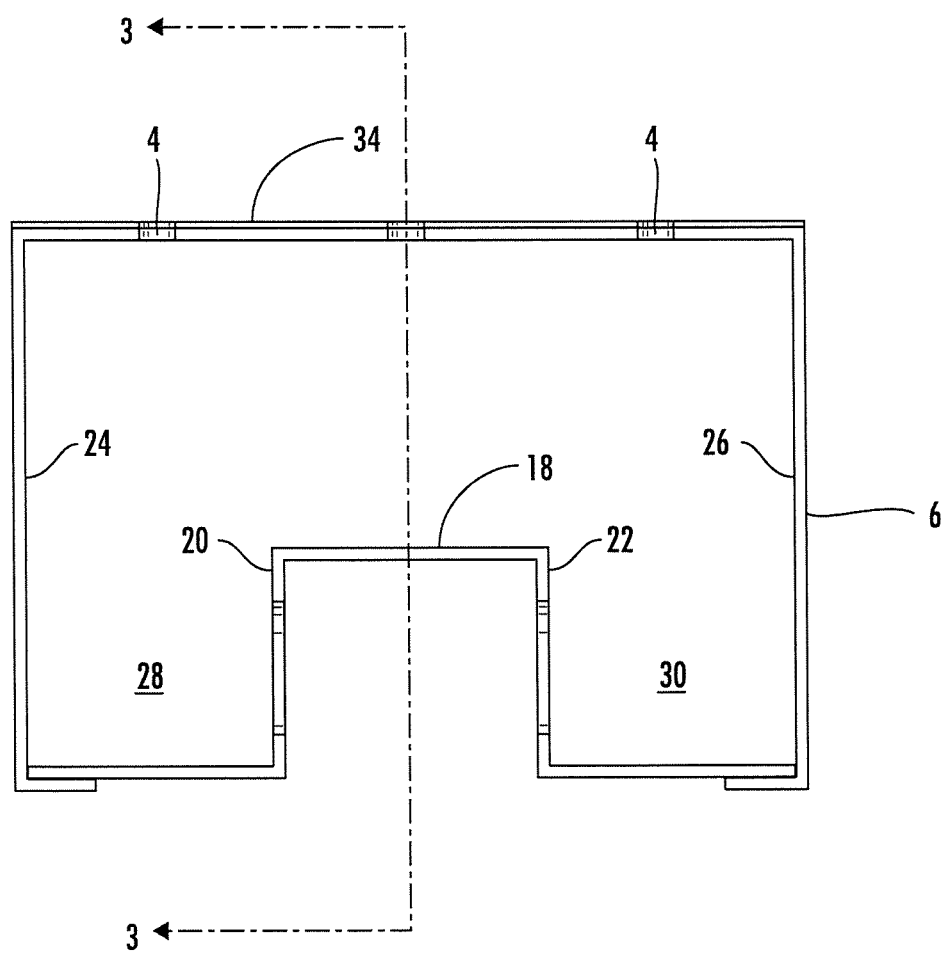
FIG. 2 is an elevation of an end of an incinerating container construct.

As shown in FIG. 2, the top enclosure 2 provides an infrared emitting surface but is formed as a unit with side member 26 and side member 28. A bottom of the incinerating container incorporates the riser 18. The incinerating container may be otherwise fabricated, but is preferred to be an enclosure for receiving, trapping and retaining oil for incineration of the oil having only the apertures 4 for receiving oil and apertures 8 for the receiving combustion air. The enclosed structure also provides efficient infrared heating for incinerating the oil and for cooking.

Figure 7:
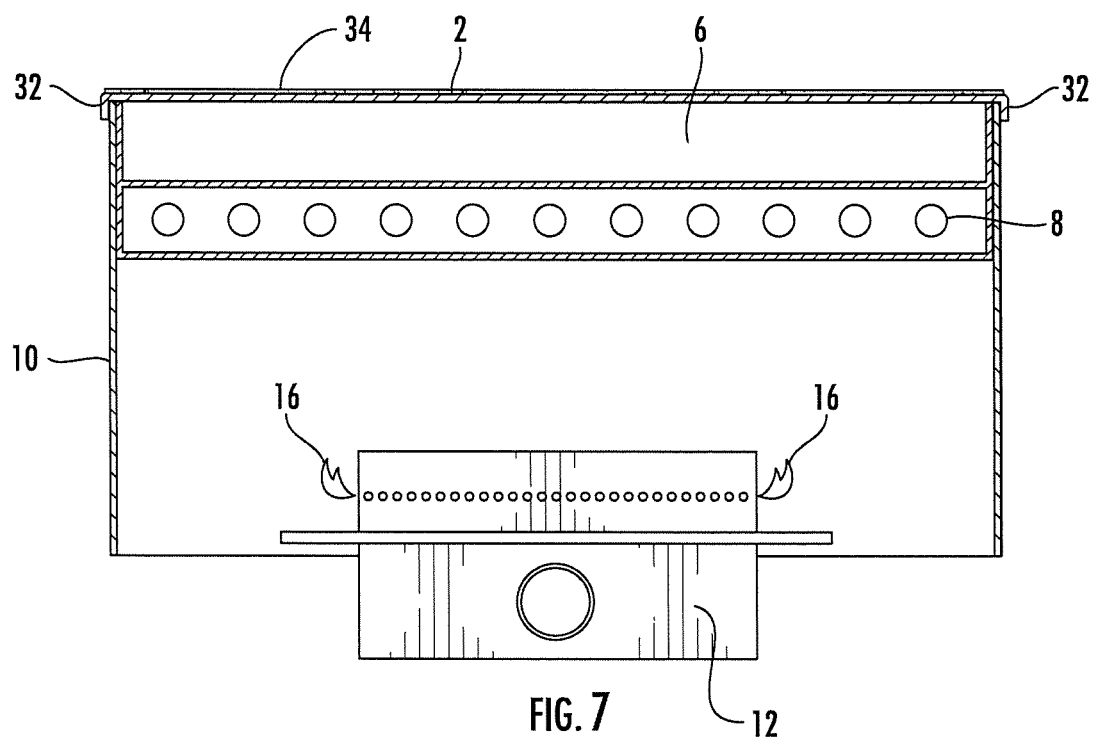
FIG. 7 is a sectioned view taken essentially along line 7-7 of FIG. 6.
Figure 9:
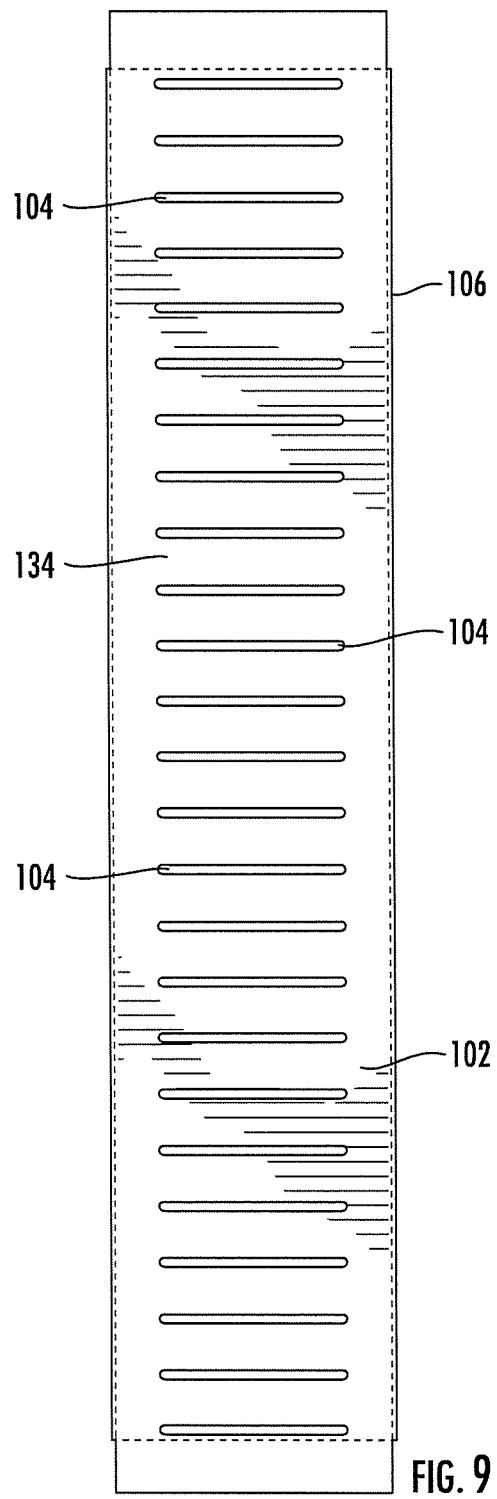
FIG. 9 is a top plan view of another embodiment of the invention.
Figure 10:
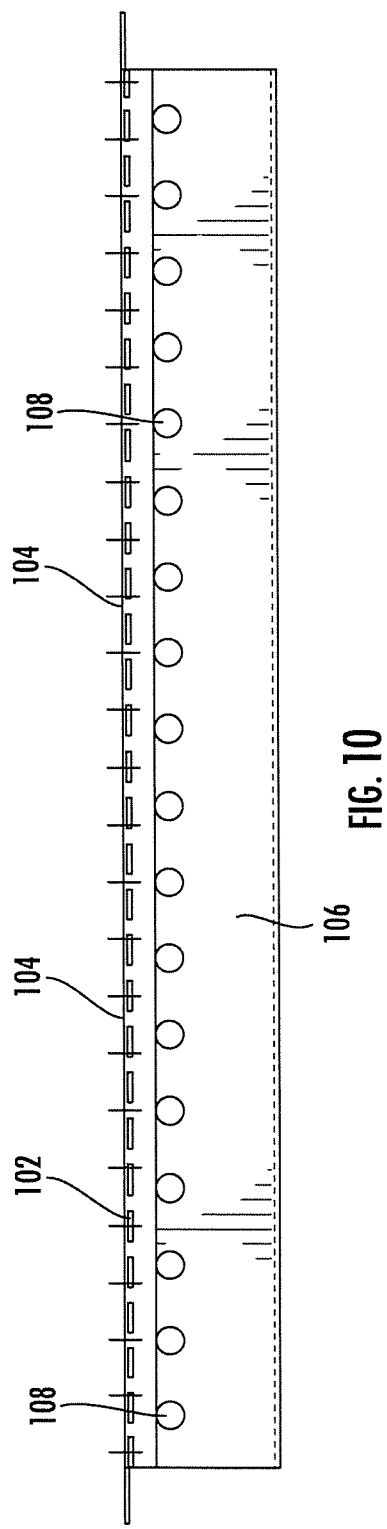
FIG. 10 is a side elevation of the embodiment incinerating container construct shown in FIG. 9.
Figure 11:
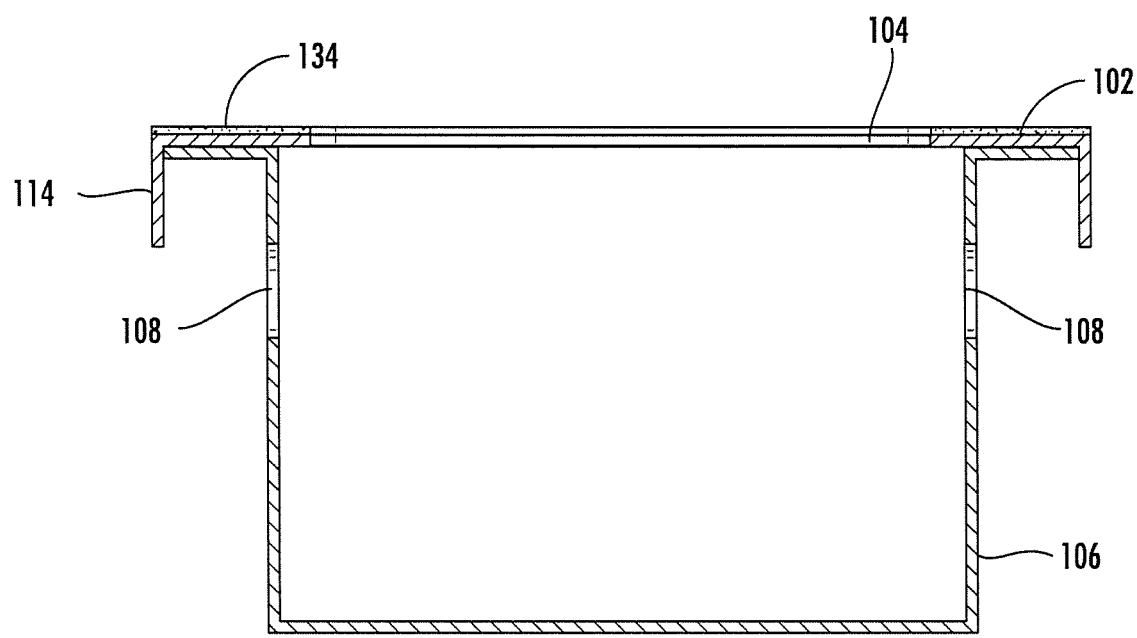
FIG. 11 is an elevation of an end of an incinerating container construct according to the embodiment of FIG. 9.

FIGS. 9-11 disclose another embodiment of the invention. This embodiment provides performance that is substantially identical to the embodiment of FIGS. 1-3. This embodiment may be used with a combustion chamber 10 and burner 12 as shown in FIG. 5, with the incinerating container 6 constructs positioned in the combustion chamber. FIG. 6, FIG. 7. The supports 32 are an example of how the incinerating containers may be removably positioned in a combustion chamber. Constructs that allow the incinerating containers to be easily removed for cleaning are preferred.

Figure 3:
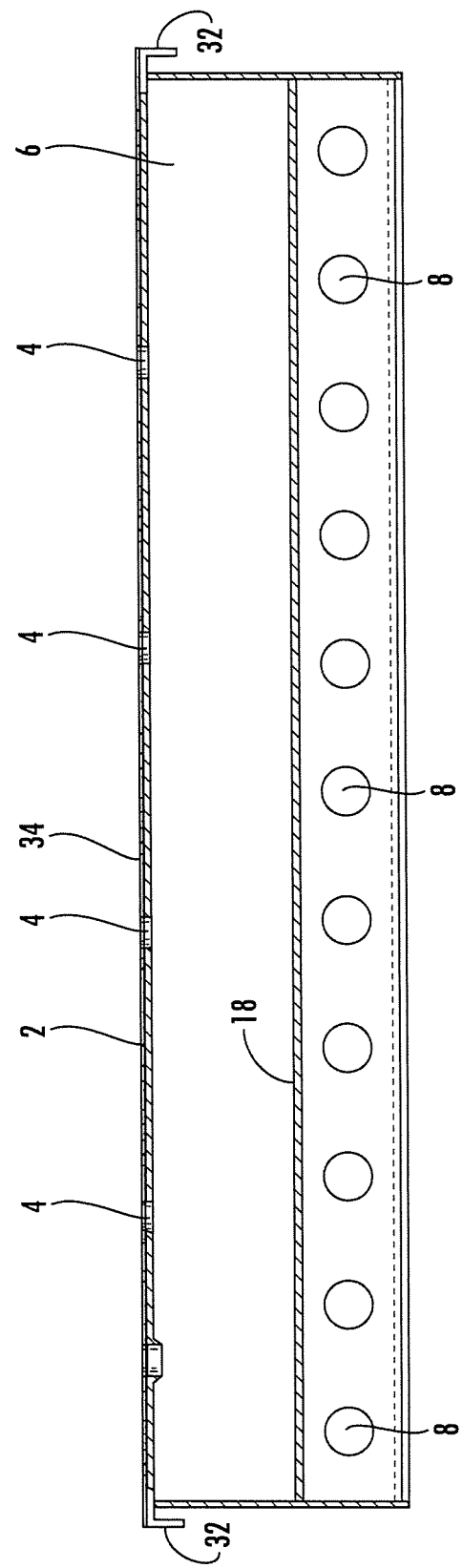
FIG. 3 is a cross section taken essentially along line 3-3 of FIG. 2.
Figure 4:
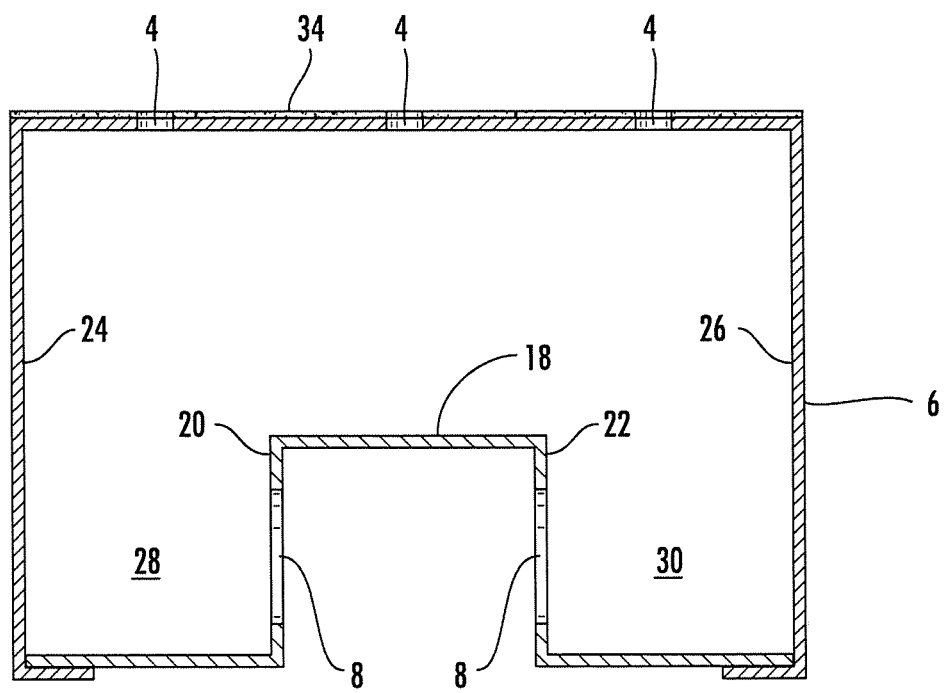
FIG. 4 is an enlarged cross section of FIG. 2.
Figure 8:
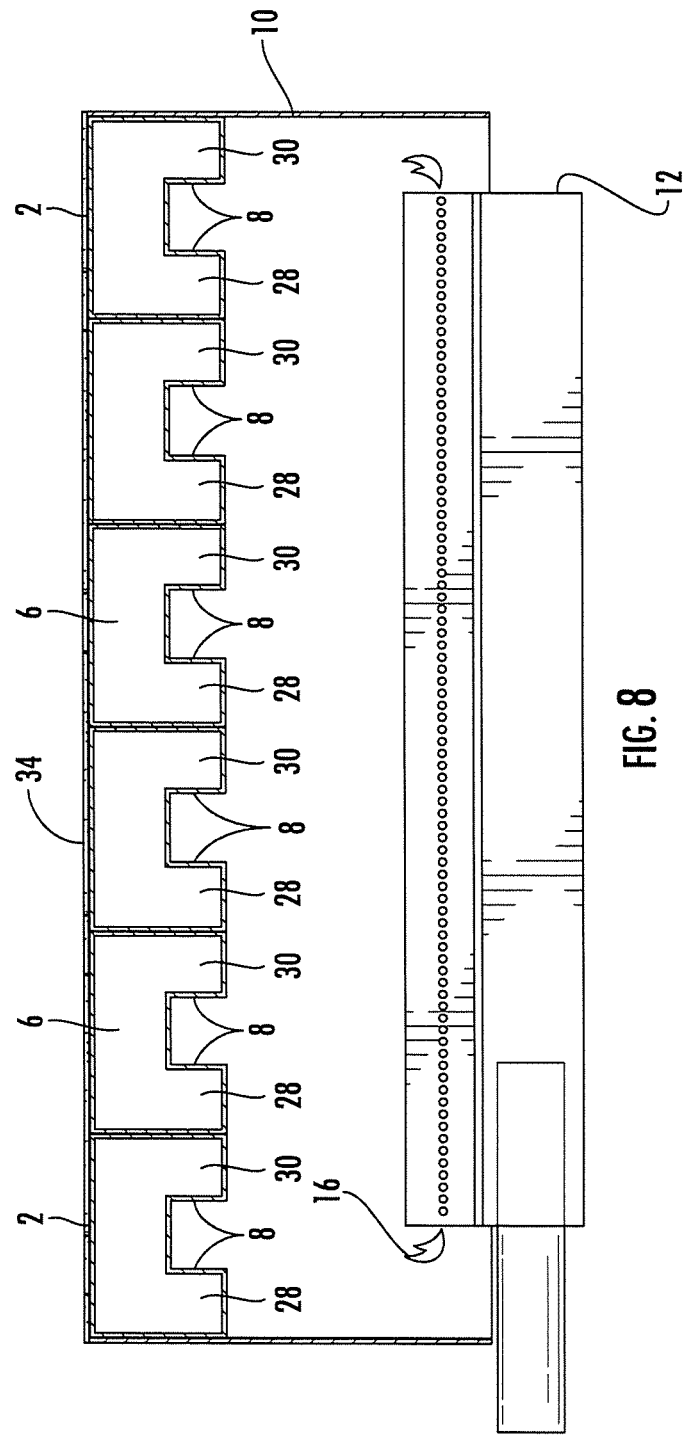
FIG. 8 is a sectioned view taken essentially along line 8-8 of FIG. 6.
Figure 15:
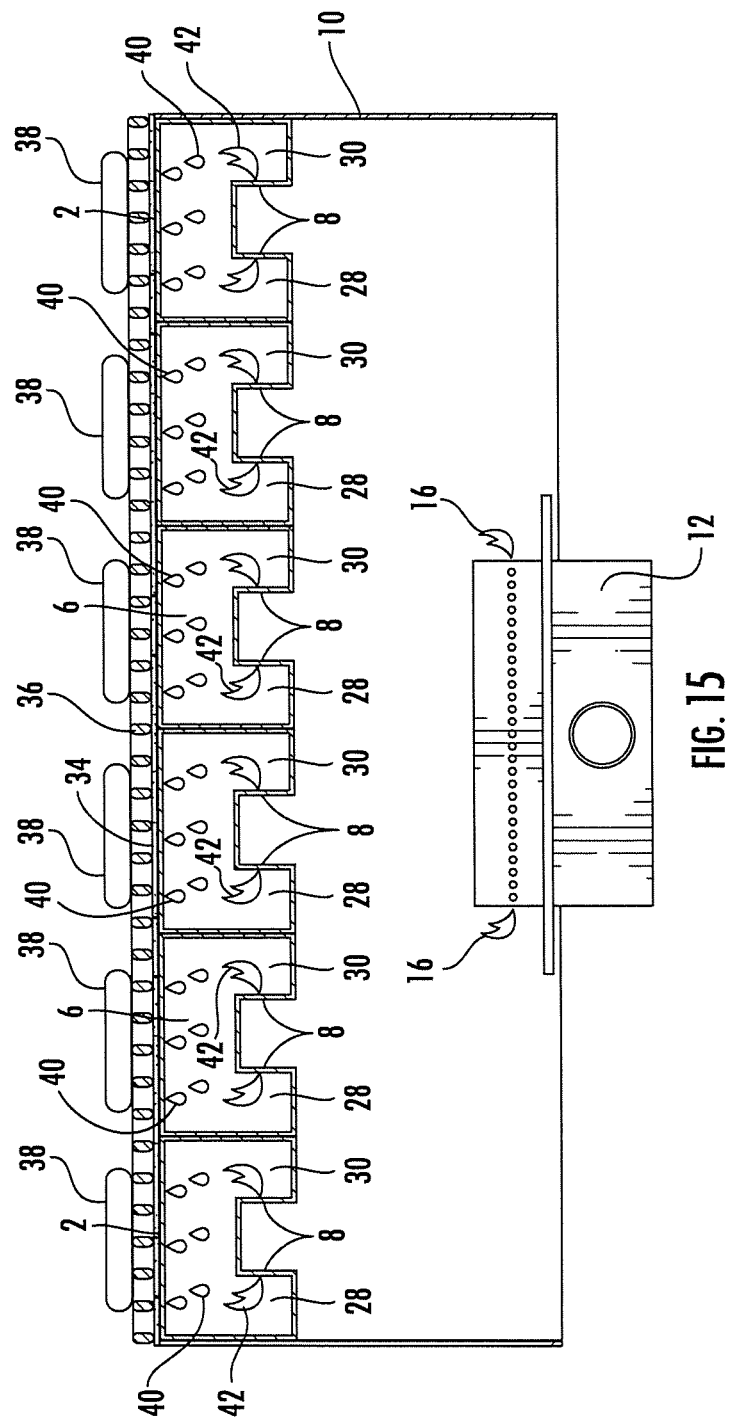
FIG. 15 is an elevation of an embodiment with a side of the combustion chamber 10 removed to reveal elements of the invention used during broiling of meat.

In the embodiment shown in FIGS. 9-11, the apertures 104 are transverse slots formed relative to the length of the infrared emitting surface which may be top enclosure 102, whereas in FIGS. 1-3 apertures 4 are longitudinal slots formed relative to the length of the top enclosure. It is preferred in many applications that the lengthwise dimension of the apertures formed in the top enclosure are generally perpendicular to the length of the burner 12. FIG. 5. The embodiment shown in FIGS. 9-11 is preferred to be used with the incinerating container construct positioned at 90 degrees to the positioning shown in FIG. 5. Therefore, the apertures are transverse rather than longitudinal. The length of the burner may be perpendicular to the length of the incinerating containers 6,106 (FIG. 8) or parallel to the length of the incinerating containers (FIG. 15).

In an embodiment, receiving apertures 108 are positioned in the exterior sides of the incinerating container 106. A spacer 114 is formed that extends from one or both sides of the incinerating container, such as extending from the top enclosure or infrared emitting surface 104 to provide spacing between adjoining incinerating container constructs or between the incinerating container construct and components of the grill, such as a combustion chamber into which the incinerating container constructs are positioned. The spacer provides spacing so that heated air such as combustion air enters the receiving apertures but does not materially exit the assembly between the adjoining incinerating container constructs. The spacer is also constructed and arranged to abut adjacent incinerating containers so that material amounts of oil do not penetrate between the adjoining incinerating container constructs.

As described with the embodiment of FIGS. 1-3, the receiving apertures 108 and/or other openings in the incinerating container provide heated air to the interior of the incinerating container constructs. Heated air is provided in sufficient quantity and at sufficient temperature to facilitate combustion of oil that enters the incinerating containers through apertures 104. Again, it is preferred that the total area of receiving apertures 108 exceed the total area of apertures 104.

Figure 12:
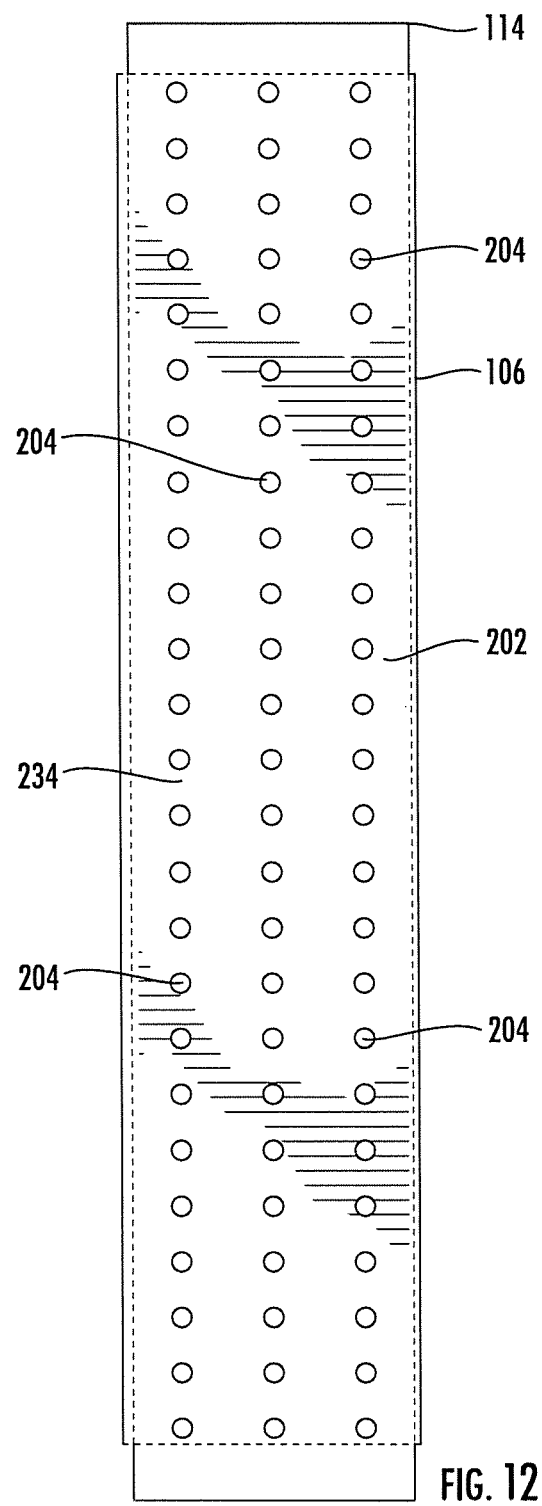
FIG. 12 is a top plan view of yet another embodiment of the invention.
Figure 13:
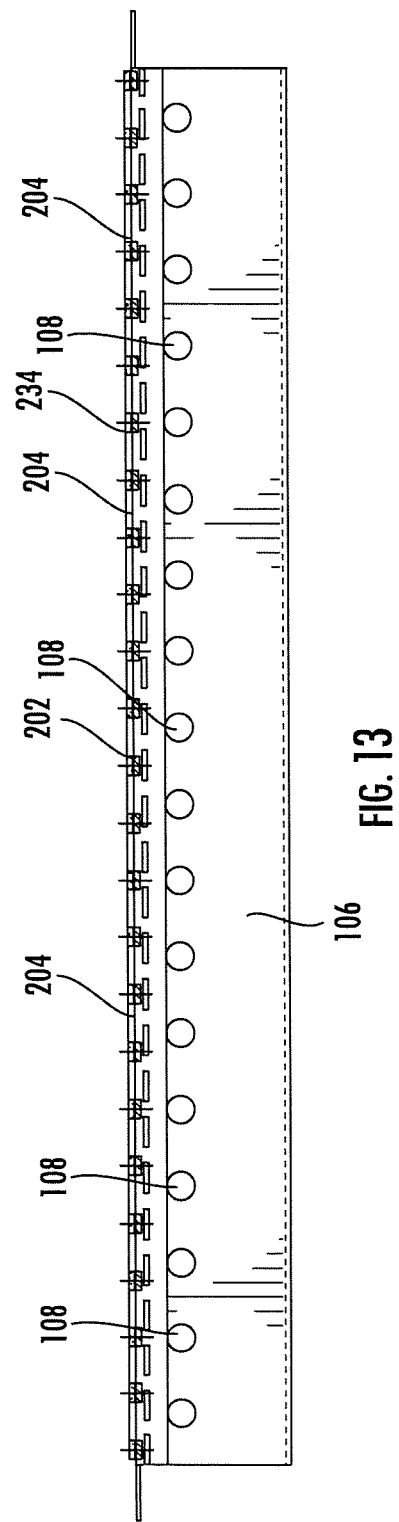
FIG. 13 is a side elevation of the embodiment incinerating container construct shown in FIG. 12.
Figure 14:
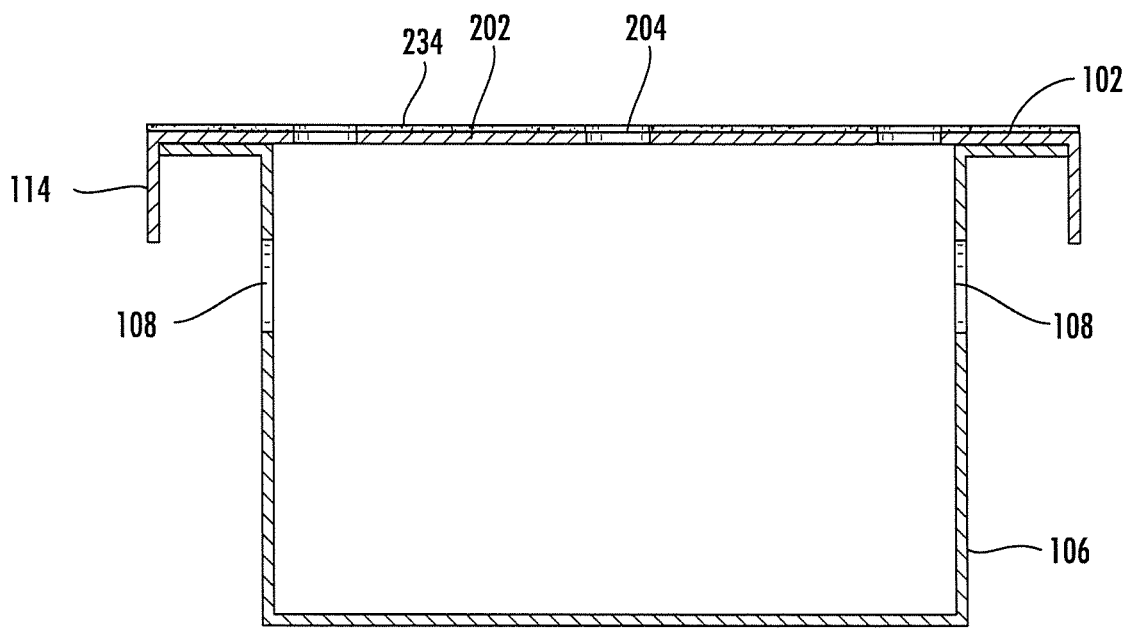
FIG. 14 is an elevation of an end of an incinerating container construct according to the embodiment of FIG. 12.

In the embodiment shown in FIGS. 12-14, the apertures 204 formed in the infrared emitting surface 202 are substantially round in shape. The incinerating container construct is otherwise as shown in the embodiment of FIGS. 9-11. However, the round apertures of FIGS. 12-14 may be used with the incinerating container construct shown in in FIGS. 1-3, just as the transverse slots of FIGS. 9-12 may be used with the incinerating container construct shown in in FIGS. 1-3.

In use, flames 16 from the heat source such as the burner 12 generate combustion air for the incinerating container 6,106. Liquified fats or other oils 40 enter the incinerating container through the apertures 4,104,204 formed in the infrared emitting surface which may be top enclosure 2,102, 202. FIG. 15. The oils are exposed to the heated air entering incinerating container through receiving apertures 8,108. The liquified fats or other oils burn within the container producing additional heat for cooking. Flames 42 generated by burning oils within the incinerating container are quenched or arrested by the apertures or otherwise retained within the incinerating container so that the flames do not reach meat 38 or other foods being cooked, thereby avoiding undesired charring of the meat.

In a preferred embodiment, the incinerating container construct 6,106 is elongated. In one embodiment the length is preferred to exceed the width by a ratio of length to width of at least 3 to 1 so that the incinerating container is elongated. A plurality of incinerating containers are positioned side by side over the heat source, such as the gas burner 12. FIG. 5. The incinerating containers abut each other so that there is insufficient spacing between the plurality of elongated incinerating containers to allow a material amount of combustion air to flow between the incinerating containers, and insufficient spacing to allow material amounts of oil from melted fat from entering between the incinerating containers that are positioned side by side.

The transfer flow of hot gasses entering and exiting the incinerating container construct increases the temperature of the incinerating container walls allowing increased radiant energy to be transferred from the walls of the incinerating container construct to the inner surface of the emitter. The preference for the total area of the receiving apertures 8, 108, 208 to exceed the total area of the apertures 4,104,204 and the use of a construct where no material amounts of heated or combustion air escapes except through the apertures 4,104,204 is believed to improve thermal efficiency over the use of grills that do not employ the incinerating containers according to the invention.

Infrared radiation is reflected by and within the interior walls of the incinerating container, thereby radiating to each other, which is believed to improve the energy efficiency of the container. Turning combustion air about 90° as it rises from the burner 12 and enters receiving apertures 8, 108, 208 is believed to improve heat transfer to the incinerating container due to turbulence created by the turning the combustion air.

By way of example and not limitation, the burner 12 produces combustion air at about 2000° F. The sides 24,26 and bottom of the incinerating container are exposed to the hot combustion air. The combustion air is retained by the combustion chamber 10 and directed into the incinerating container 6,106 through receiving apertures 8,108. An oxidized stainless steel incinerating container with an emissivity of about 0.52 will achieve an internal temperature of about 1250° F. with combustion air provided at about 2000° F. At this temperature, oil 40 from animal fat will combust and flame 42.

Continuing with the example, a ceramic or ceramic coated top enclosure 2,102, 202 may have an infrared emissivity of about 0.92. Further, the top enclosure is not directly exposed to the hot (2000° F.) combustion air. Rather than receiving energy, the top surface is giving up energy. The increased emissivity plus the energy loss means that the top surface is cooler than the interior of the incinerating container. In this example, the temperature of the top enclosure will be about 750° F. The higher emissivity of the top enclosure as compared to the incinerating container and the energy loss means that the top enclosure will have a lower temperature than the interior of the incinerating container. The result is that the top enclosure yields enough energy to cook food 38, but does not encourage combustion or flare ups from oil falling on the top surface of the incinerating containers. The oil 40 from the fat flows through the apertures 4, 104, 204 and into the incinerating container where it burns away. The flame produced by the burning oil is retained within the incinerating container and is not exposed to the food. The top enclosure is constructed to have a higher radiation emissivity than the container of the incinerating container, so that the temperature of the top enclosure is lower than the container for the same amount of energy exposure. The emissivity of the top enclosure is preferred to be such that the temperature of the top enclosure is materially lower than the internal temperature of the incinerating container for the same energy input, with "materially lower" meaning not less than 20% lower temperature.

The incinerating container 6,106 is particularly useful in commercial applications. Unexpectedly, the incinerating container construct of the invention has been demonstrated in commercial settings to substantially reduce gas/fuel consumption while increasing the heat transfer from the hot gasses to the surfaces of the incinerating container construct. Using an incinerating container having a ceramic coated top enclosure 2,102, 202 in one embodiment was demonstrated to emit greater than 50% more energy (measured in BTUs) for the same energy input as compared to a standard commercial grill. The energy savings, when operating 12 hours a day, as is common in restaurants, is significant.

What is claimed is:

1. A cooking device, comprising:
    an incinerating container, the incinerating container comprising a generally horizontal top enclosure having a plurality of apertures formed therein that communicate with an interior of the incinerating container, the incinerating container comprising a generally vertical side member, the side member having a generally vertical receiving aperture formed therein that communicates with the interior of the incinerating container, the incinerating container constructed and arranged to receive oil from above the incinerating container and into the interior of the incinerating container through the plurality of apertures formed in the top enclosure, the incinerating container further constructed and arranged to retain the oil within the interior of the incinerating container, and wherein the plurality of apertures formed in the top enclosure are so constructed and arranged as sufficiently small to substantially prevent flame from incineration of the oil from exiting the plurality of apertures formed in the top.

2. A cooking device as described in claim 1, the incinerating container comprising a riser formed in a lower surface of the incinerating container, the riser comprising the generally vertical side member having the plurality of generally vertical receiving apertures formed therein.

3. A cooking device as described in claim 1, wherein the incinerating container is positioned within a combustion chamber.

4. A cooking device as described in claim 1, wherein a plurality of incinerating containers are positioned within a combustion chamber.

5. A cooking device as described in claim 1, wherein a plurality of elongated incinerating containers are positioned within a combustion chamber.

6. A cooking device as described in claim 1, wherein a plurality of elongated incinerating containers, each abutting another incinerating container of the plurality of elongated incinerating containers, are positioned within a combustion chamber.

7. A cooking device as described in claim 1, wherein a plurality of elongated incinerating containers are positioned within a combustion chamber, and wherein an incinerating container of the plurality of the incinerating containers comprises a spacer extending from a side of the incinerating container of the plurality of incinerating containers and wherein the spacer abuts another incinerating container of the plurality of incinerating containers.

8. A cooking device as described in claim 1, wherein a plurality of elongated incinerating containers are positioned within a combustion chamber, and wherein an incinerating container of the plurality of the incinerating containers comprises a spacer extending from a side of the incinerating container of the plurality of incinerating containers and wherein the spacer abuts another incinerating container of the plurality of incinerating containers, and wherein the side of the incinerating container from which the spacer extends comprises a generally vertical receiving aperture formed in the side of the incinerating container.

9. A cooking device as described in claim 1, the incinerating container comprising a riser formed in a lower surface of the incinerating container, wherein a first receptacle is formed on a first side of the riser and below a top of the riser and a second receptacle formed on a second side of the riser and below a top of the riser, wherein the first receptacle and the second receptacle are so constructed and arranged to retain the oil within the first receptacle and the second receptacle, wherein heated air enters the generally vertical receiving aperture formed in the side member for incineration of the oil within the interior of the incinerating container.

10. A cooking device as described in claim 1, the incinerating container comprising a riser formed in a lower surface of the incinerating container, the riser comprising the generally vertical side member having the generally vertical receiving aperture formed therein, the incinerating container comprising a first exterior side member that is opposite the generally vertical side member wherein a first receptacle is formed between the generally vertical side member and the first exterior side member and wherein a second receptacle is formed between a second side member and a second exterior side member, and wherein the first receptacle and the second receptacle are so constructed and arranged to retain the oil within the first receptacle and the second receptacle, wherein heated air enters the receiving aperture formed in the generally vertical side member for incineration of the oil within the interior of the incinerating container.

11. A cooking device as described in claim 1, wherein the top enclosure comprises a ceramic.

12. A cooking device as described in claim 1, wherein the total area of receiving apertures formed in the incinerating container exceeds the total area of the plurality of apertures formed in the top enclosure.

13. A cooking device as described in claim 1, wherein the top enclosure has an infrared radiation emissivity that materially exceeds infrared radiation emissivity of interior surfaces of the incinerating container.

14. A cooking device as described in claim 1, wherein the operating temperature of the top enclosure is materially lower than the operating temperature of the incinerating container.

15. A cooking device as described in claim 1, wherein the incinerating container is suspended over a heat source, and heated air from the heat source enters the generally vertical receiving aperture formed in the generally vertical side member for incineration of the oil within the interior of the incinerating container.

16. A cooking device, the cooking device comprising:
a heat source;
a plurality of incinerating containers positioned in a side by side relationship;
a combustion chamber constructed and arranged to direct heated air from the heat source into the plurality of incinerating containers;
the plurality of incinerating containers each comprising a generally horizontal top enclosure having a plurality of apertures formed therein that communicate with an interior of the incinerating container, the plurality of incinerating containers each comprising a generally vertical receiving aperture formed therein, the generally vertical receiving aperture constructed and arranged to receive heated air from the heat source and direct heated air into the interior of the incinerating container, the incinerating containers each constructed and arranged to receive oil through the apertures formed in the top enclosure and constructed and arranged to retain oil within the interior of the incinerating container.

17. An incinerating container for a cooking device as described in claim 16, wherein the plurality of incinerating containers are so constructed and arranged within the combustion chamber to retard material heated air from escaping between incinerating containers.

18. A cooking device as described in claim 16, each incinerating container of the plurality of incinerating containers comprising a riser formed in a lower surface of the incinerating container, the riser comprising a generally vertical side member having the generally vertical receiving aperture formed therein.

19. A cooking device as described in claim 16, each incinerating container of the plurality of incinerating containers comprising a riser formed in a lower surface of the incinerating container, wherein a first receptacle is formed in a side of the riser and below a top of the riser and a second receptacle is formed on a second side of the riser and below a top of the riser, wherein the first receptacle and the second receptacle are so constructed and arranged to retain the oil within the first receptacle and the second receptacle, wherein heated air enters the plurality of receiving apertures formed in the side members for incineration of the oil within the interior of the incinerating container.

20. A cooking device as described in claim 16, each incinerating container of the plurality of incinerating containers comprising a riser formed in a lower surface of the incinerating container, the riser comprising the generally vertical side member having the generally vertical receiving aperture formed therein and the riser comprising a second generally vertical side member formed therein, the incinerating container comprising a first exterior side member that is opposite the generally vertical side member and a second exterior side member that is opposite the second side member, wherein a first receptacle is formed between the first side member and the first exterior side member and wherein a second receptacle is formed between the second side member and the second side member, and wherein the first receptacle and the second receptacle are so constructed and arranged to retain the oil within the first receptacle and the second receptacle, wherein heated air enters the plurality of receiving apertures formed in the side members for incineration of the oil within the interior of the incinerating container.

21. A cooking device as described in claim 16, wherein the top enclosure of each incinerating container of the plurality of incinerating containers comprises a ceramic.

22. A cooking device as described in claim 16, wherein the total area of receiving apertures formed in each incinerating container of the plurality of incinerating containers exceeds the total area of the plurality of apertures formed in the top enclosure.

23. A cooking device as described in claim 16, wherein the top enclosure of each incinerating container of the plurality of incinerating containers has an infrared radiation emissivity that materially exceeds infrared radiation emissivity of interior surfaces of the incinerating container.

24. A cooking device as described in claim 16, wherein the operating temperature of the top enclosure of each incinerating container of the plurality of incinerating containers is materially lower than the operating temperature of the incinerating container.

25. A cooking device as described in claim 16, wherein the plurality of incinerating containers are suspended over a heat source, and heated air from the heat source enters the receiving aperture for incineration of the oil within the interior of the incinerating containers.

* * * * *